United States Patent [19]

Akra et al.

[11] Patent Number: 5,644,656
[45] Date of Patent: Jul. 1, 1997

[54] METHOD AND APPARATUS FOR AUTOMATED TEXT RECOGNITION

[75] Inventors: Mohamad A. Akra, Beirut, Lebanon; Sanjoy K. Mitter, Cambridge, Mass.

[73] Assignee: Massachusetts Institute of Technology, Cambridge, Mass.

[21] Appl. No.: 254,938

[22] Filed: Jun. 7, 1994

[51] Int. Cl.$^6$ ...................... G06K 9/62
[52] U.S. Cl. .............. 382/215; 382/195; 382/203; 382/206; 382/209; 382/219
[58] Field of Search .................. 382/194, 195, 382/198, 199, 200, 203, 205, 206, 209, 215–219, 249, 221

[56] References Cited

U.S. PATENT DOCUMENTS

| | | | |
|---|---|---|---|
| 4,190,820 | 2/1980 | Crane et al. | 382/215 |
| 4,736,437 | 4/1988 | Sacks et al. | 382/216 |
| 5,040,222 | 8/1991 | Muroya | 382/215 |
| 5,050,224 | 9/1991 | Mori | 382/216 |
| 5,109,431 | 4/1992 | Nishiya et al. | 382/209 |
| 5,245,674 | 9/1993 | Cass et al. | 382/16 |
| 5,253,307 | 10/1993 | Wayner et al. | 382/22 |
| 5,287,415 | 2/1994 | Chetalos et al. | 382/215 |
| 5,333,209 | 7/1994 | Sinden et al. | 382/218 |
| 5,384,867 | 1/1995 | Barsley et al. | 382/249 |
| 5,426,711 | 6/1995 | Kitamura | 382/218 |
| 5,452,373 | 9/1995 | Shou et al. | 382/209 |

OTHER PUBLICATIONS

Grenander, *General Pattern Theory—A Mathematical Study of Regular Structures,* Oxford University Press, New York, 1993, pp. ix–xi and 505–524.
Mumford, D., "Mathematical Theories of Shape: Do They Model Perception?", *SPIE vol. 1570 Geometric Methods in Computer Vision,* 1991, pp. 2–10.
Arkin et al., "An Efficiently Computable Metric For Comparing Polygonal Shapes," *IEEE Transactions On Pattern Analysis and Machine Intelligence,* Mar. 1991, vol. 13, No. 3, pp. 209–216.
Grimson et al. "Introduction to the Special Issue on Interpretation of 3–D Scenes—Part I", *IEEE Transactions On Pattern Analysis and Machine Intelligence,* Oct. 1991, vol. 13, No. 10, pp. 969–970.
Grimson et al. "On the Verification of Hypothesized Matches in Model–Based Recognition", *IEEE Transactions on Pattern Analysis and Machine Intelligence,* Dec. 1991, vol. 13, No. 12, pp. 1201–1213.
Grimson et al. "Introduction to the Special Issue on Interpretation of 3–D Scenes", *IEEE Transactions on Pattern Analysis and Machine Intelligence,* Feb. 1992, vol. 14, No. 2, pp. 97–98.
Huttenlocher et al., "A Multi–Resolution Technique for Comparing Images Using the Hausdorff Distance", *Cornell University, Dept. of Computer Science, Technical Report, TR 92–1321,* Dec. 1992, pp. 1–20.
Huttenlocher et al., "Tracking Non–Rigid Objects in Complex Scenes", *Cornell University, Dept. of Computer Science, Technical Report, TR 92–1320,* Dec. 1992, pp. 1–23.
Huttenlocher et al. "Comparing Images Using the Hausdorff Distance" *IEEE Transactions on Pattern Analysis and Machine Intelligence,* Sep. 1993, vol. 15, No. 9, pp. 850–863.

*Primary Examiner*—Leo Boudreau
*Assistant Examiner*—Bipin Shalwala
*Attorney, Agent, or Firm*—Testa, Hurwitz & Thibeault, LLP

[57] ABSTRACT

A method, and related apparatus, for recognizing alphanumeric characters within a sample includes applying ideal alphanumeric character templates to the sample to identify each template which is included substantially within the sample. A template will be considered to be included substantially within the sample even if the sample has portions thereof with which the template does not substantially correspond or substantially match. That is, a template can be considered to be included substantially within the sample even if the template and the sample do not have a substantially one-to-one symmetrical correspondence. Of all of the templates which are identified as included substantially within the sample, the template having the most information (e.g., the template which requires the largest number of data points to define its shape) is selected as a recognized version of the sample.

18 Claims, 7 Drawing Sheets

SAMPLE = SET OF (x,y) POSITIONS

HYPOTHESIS GENERATION — 60

LIST OF POSSIBLY OVERLAPPING HYPOTHESIS

DECISION — 62

TEXT = LIST OF NONOVERLAPPING HYPOTHESIS

| | | | | | |
|---|---|---|---|---|---|
| 1 | 1 | 2 | 2 | 3 | 4 |
| 4 | 5 | 5 | 6 | 7 | 8 |
| 9 | A | A | A | A | B |
| C | D | E | F | G | H |
| I | J | K | L | M | M |
| N | O | P | Q | R | S |
| T | T | T | U | V | W |
| W | W | W | W | W | W |
| X | X | Y | Z | Z | |

FIG. 9B

| | | | | | |
|---|---|---|---|---|---|
| 1 | 1 | 2 | 2 | 2 | 3 |
| 3 | 4 | 4 | 5 | 6 | 7 |
| 7 | 8 | 9 | 9 | A | A |
| B | C | D | E | F | G |
| H | I | J | J | K | L |
| M | M | N | O | P | Q |
| R | S | S | T | U | V |
| W | W | W | W | X | Y |
| Z | | | | | |

METHOD AND APPARATUS FOR AUTOMATED TEXT RECOGNITION

This invention was made with government support under contract Number DAAL03-92-G-0115 awarded by the United States Army. The government has certain rights in the invention.

FIELD OF THE INVENTION

This invention relates to automated text recognition, and more particularly, to methods and apparatus which use an asymmetrical measure of similarity to identify known shapes within a sample shape presented for recognition, where the known shapes include "ideal" alphanumeric character templates and the sample shape presented for recognition includes at least one alphanumeric character such as a handwritten or machine-printed alphanumeric character.

BACKGROUND OF THE INVENTION

Automated text recognition involves using digital computers to recognize letters and digits from a predefined "alphabet" of templates. A typical automated text recognition system measures the similarity between a sample to be recognized and each of the predefined templates with a symmetrical mathematical measurement. Despite continuous research efforts for almost four decades, the performance of known automated text recognition systems generally does not compare to the capabilities of a human in recognizing text such as cursive script which typically varies in many respects including size and style.

Traditionally, two approaches have been used for automated text and/or pattern recognition: a statistical approach and a linguistic approach. The general idea of both approaches is to select a set of measurements called features (e.g., the density of black pixels, the number of loops in the character to be recognized, the type and position of a stroke) and to implement a set of decision rules which constitute a classifier. Because of variability across samples of the same pattern class, the features generally are unknown and are thus modeled as random variables. These random variables define a feature space. In the statistical approach, the feature space is partitioned according to the set of decision rules into regions corresponding to different patterns (e.g., one region for A, another region for B, etc.). Given an unknown sample pattern to be recognized, the procedure in the statistical approach is to: extract a vector of features; determine the region to which it belongs; and assign to the pattern a label for that region. In the linguistic approach, a pattern class is considered to be a set of features generated by, for example, a non-deterministic finite state machine, a Markov process, or a push-down automata. Given an unknown sample pattern to be recognized, the procedure in the linguistic approach is to: extract the set of features; determine the machine which generated it; and label the unknown pattern accordingly.

A main difference between the statistical and the linguistic approaches lies in the structure of the classifier which, in a sense, is determined by the definition of a character. In the statistical approach, classifiers include nearest mean classifiers, Fisher classifiers, neural network classifiers, and nearest neighbor classifiers. In the linguistic approach, classifiers include machine matching classifiers. In general, the statistical approach is older than the linguistic approach and is typically used for recognizing relatively simple patterns such as characters. The linguistic approach generally is preferred for recognizing more complex patterns such as three-dimensional images.

With both the statistical and linguistic approaches, it is necessary to select a useful set of features (which is sometimes termed the problem of representation or the representation problem). This requirement of both approaches can result in difficulty in implementing either approach. For instance, in a handwritten text recognition problem, selecting the pixel values of the text image as features is not a useful strategy. While the set of pixel values marks a complete representation in the sense that any other representation can be derived from it, it is not a convenient representation with which to deal. Variations in the samples of a handwritten pattern to be recognized typically cause a wide scale correlation among the features which tends to complicate the design and analysis of the classifier.

The standard paradigm of text and/or pattern recognition which involves feature extraction and subsequent classification (such as is employed in both the statistical and linguistic approaches) typically is inadequate to achieve desirable levels of recognition speed and recognition accuracy. A new and better approach to the problem of automated text recognition whereby both machine-printed and handwritten (especially cursive script) alphanumeric characters can be recognized relatively simply and quickly and with a relatively high degree of accuracy is needed.

SUMMARY OF THE INVENTION

It is observed that the representation problem mentioned in the preceding section can be approached by focusing the analysis on one of two sources of uncertainty or noise, where the two sources are:

(i) external sources which result in, for example, blurring, ink fading, scratches, and the like; and (ii) production-related sources. The focus is placed on the production-related sources of uncertainty/noise by analyzing the disturbances or inaccuracies imparted to the to-be-recognized text during the process by which that text is created. Such inaccuracies can occur, for example, by the hand of a person printing or writing the text or by a machine (e.g., printer) used to machine-print the text. While the person has an ideal image of the character he or she wants to write, the actual character reduced to writing typically is a distorted version of this ideal. Similarly, while the machine is designed to print the same character the same way every time it is called upon to do so, the machine occasionally will smear a character or otherwise produce irregular printing for some reason such as a mechanical or electrical malfunction. The guiding operational principle which flows from this uncertainty/noise analysis approach is that ideal templates should be deformed by a deformation process which corresponds as closely as possible to the faulty (human or machine) process which created the to-be-recognized text. Other principles which flow from the uncertainty/noise analysis approach include:

recognition should be attempted directly from the data which represents the to-be-recognized sample without decomposing the sample into primitives such as strokes; and while it is desirable to recognize words directly from the sample data, it is more practical to recognize characters from the sample data because the number of possible characters is considerably less than the number of possible words.

The invention generally relates to an approach to recognition which has an affinity to the way humans recognize alphanumeric text and other patterns. Uncertainties, disturbances, and/or inaccuracies imparted to the to-be-recognized alphanumeric characters during creation thereof are captured and dealt with by focusing on "ideal" alphanumeric characters (i.e., templates) and deformations of the templates. These templates (and/or deformations thereof) are applied to a to-be-recognized sample in order to determine which templates are substantially included within (i.e., are subsets of or are substantially the same as) the sample. In other words, the invention involves determining whether what is ideally known (i.e., the templates) is contained within an unknown quantity (i.e., the sample presented for recognition). If each template is superimposed over the sample, it can be seen whether each template is substantially within the sample. If the sample is larger, smaller, slanted, rotated, etc. with respect to a template, the template can be deformed in a variety of ways and then applied to the sample to determine if it then falls within the sample. Template deformation can include size changes, slanting, rotation, etc. and can be performed one or more times. Deformation of a template can be accomplished by multiplying the template with one or more matrices which represent the desired deformation(s). In general, template deformation is an attempt to change the ideal template by a process similar to the faulty creation process which deformed the sample from its ideal shape in the first instance.

Whether or not the template is deformed one or more times and/or in one or more ways, all templates found to be substantially included within the sample are examined in accordance with the invention to determine which contain the most information. If, as in a preferred embodiment of the invention, the templates and the samples are defined by sets of data points, the template with the most information is the template with the largest number of data points. This template with the most information is the one which has the most in common with the sample, and it is this template (in its ideal, undeformed form) which is produced as the recognized version of the input sample.

As an example, if the sample is a handwritten or machine-printed letter E, at least the templates E and F will be determined to be included within the sample. The template for the number 1, depending on its shape, also might be determined to be included within the sample. In any event, it is the template for the letter E which will be selected as the recognized version of the sample because it has more strokes than the template F or the template 1, specifically the template E has one more stroke (at the bottom) than the template F and at least two more strokes than the template 1. If the sample is a slanted handwritten or machine-printed letter E, the E and F templates will have to be similarly deformed before either template will be found to fall substantially within the sample.

In accordance with the invention, the sample presented for recognition is not deformed or modified in any way, other than filtering out additive noise; it is the templates which are applied to the sample (and deformed if necessary) to determine if they (or the deformations thereof) fall substantially within the sample. This principle of operation is central to the invention, and it results from the realization that a mathematical measure of similarity between a sample and a template need not be symmetrical to be useful. That is, it is not necessary to find an exact or near exact symmetrical one-to-one match between a sample and a template whereby the sample is the same or substantially the same as the template and vice versa. In fact, in sharp contrast to known recognition systems and approaches, an asymmetrical mathematical measure of similarity is employed by the invention.

Use of this asymmetrical metric allows a known pattern (i.e., a template) to be discovered in a sample even if the sample includes other information (e.g., "blobs" or other extraneous marks or a touching character) which prevents the finding of an exact or near exact symmetrical one-to-one correspondence between the sample and the template. Consequences of asymmetry are that the amount of training necessary is relatively little and that the training set (i.e., the number of templates) required is relatively small, as compared to known recognition systems and approaches which insist on symmetry.

In accordance with the invention, this asymmetrical metric is determined by a function described and referred to herein as a single-sided Hausdorff distance. The single-sided Hausdorff also is referred to as the directed Hausdorff function. In brief, the single-sided Hausdorff provides a measure of the "distance" from a template to a sample, and when that distance is zero or less than or equal to some acceptably small number ($\leq \epsilon$), the template is said to be included within the sample. If the sample to be recognized is slanted or otherwise deformed (e.g., because of the writer's tendency to slant letters and/or words forwards), the template can be deformed until the single-sided Hausdorff yields a distance which is zero or nearly so ($\leq \epsilon$).

A second principle also central to the invention is the concept of maximum understanding. This principle states that of all of the templates found to be included within the sample, the template which most closely matches the sample is the one with the most complexity and thus the one which has the most information (e.g., the one which requires the largest number of data points to define its shape). This determination does not involve the use of the sample; it is a determination made by examining all of the templates found to be included within the sample by a previous operation.

Because of these two central principles, the invention is capable of relatively simply and elegantly handling difficult recognition problems such as characters touching each other, extraneous marks touching or near characters, underlined characters, etc.

In accordance with the invention, just as sets of points can be recognized as alphanumeric characters, sets of characters can be recognized as words, and sets of words can be recognized as sentences, paragraphs, concepts, etc. While the first step generally is to recognize characters, essentially the same inventive principles, tools, and processes used to recognize characters can be applied at different levels of abstraction to recognize words, sentences, etc. Organizing the recognition process in a hierarchy corresponding to different levels of abstraction and providing appropriate feedback mechanisms between the levels results in generally results in an overall improvement in recognition accuracy and efficiency.

Other objects, aspects, features, and advantages of the invention will become apparent from the following description and from the claims.

DESCRIPTION

The invention generally relates to automated recognition of text and/or alphanumeric characters. Herein, the terms text, characters, and alphanumeric characters should be taken generally to include text in any language and any other form of writing in any language including symbols, letters, numbers, punctuation, blanks, etc. whether created by a person or by a machine (e.g., a printer). If handwritten by a person, the alphanumeric characters can be in printed form, cursive form, or some combination thereof. If machine-printed, the alphanumeric characters can be in any formats, styles, fonts, etc. A combination of person-created and machine-created text also is included within parameters of these terms. In general, the terms text, characters, and alphanumeric characters as used herein are to be interpreted broadly so as to cover virtually any marking(s) intended to convey information.

Applications of automated text recognition include readers for the blind, data entry, reading addresses on mail, and check processing. Regardless of the application, one or more computers and/or related electronic devices typically are employed to perform the recognition process(es).

Figure 1A:
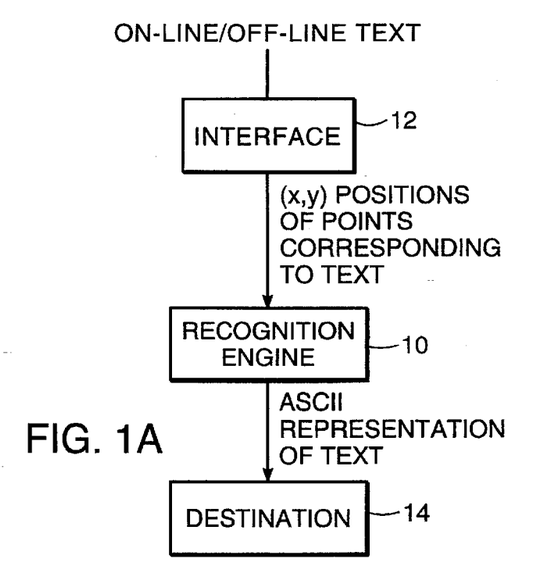
FIG. 1A is a high level block diagram of a recognition system according to the invention including an interface module and a destination module.

Referring to FIG. 1A, a recognition engine 10 according to the invention is provided with text to be recognized by an interface module 12. The recognized version of the input text is output by the recognition engine 10 to a destination module 14. In a preferred embodiment of the invention, the recognition engine 10 operates on sets of data points representative of the text presented for recognition by the interface module 12. Each set preferably includes a plurality of data points, and each data point preferably is a positional coordinate (e.g., an X-Y coordinate pair identifying a position in a two-dimensional X-Y plane). All of the data points which together make-up a set serve to define the shape of at least a portion of the to-be-recognized text. Each of the ideal templates which are applied to the to-be-recognized sample by the recognition engine 10 also is defined by a set of data points. In general, the data points of a set indicate the position of the "on" or "black" pixels which form the shape of the samples and templates. The recognition engine 10 processes these sets of data points and outputs a recognized version of the text to the destination module 14. The recognized version of the text preferably is an ASCII (American Standard Code for Information Interchange) code representing each of the characters in the text. Having transformed each of the characters in the input text into its equivalent ASCII code, the recognition engine 10 provides those codes to the destination module 14 which can use the ASCII codes in a variety of ways as described later with reference to FIGS. 3A–3D.

Figure 1B:
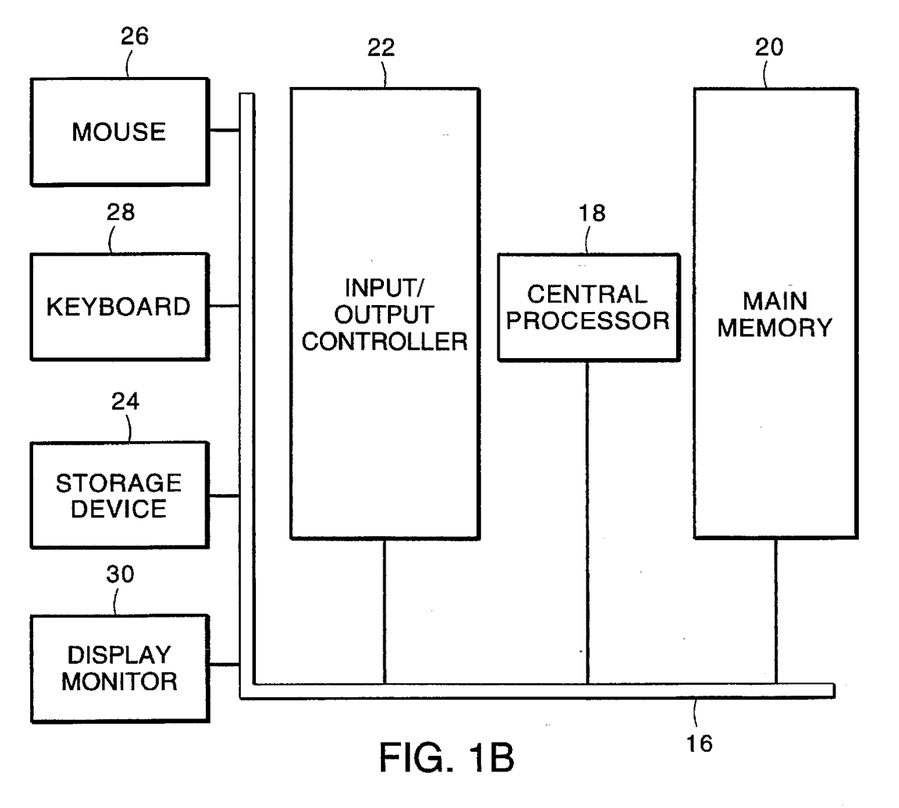
FIG. 1B is a simplified functional block diagram of a digital computer which can be used to implement and execute the recognition system of FIG. 1A.

While the recognition engine 10 of FIG. 1A can be implemented in a variety of ways including with specially-designed, dedicated electronics, it is preferred to implement it with one or more general purpose computers such as the digital computer of FIG. 1B. Referring to FIG. 1B, the digital computer typically includes an internal bus 16 electrically connecting and allowing communication between a central processor 18, a main memory 20, an input/output controller 22, and a storage device 24. The storage device 24 can include a hard disk, a floppy disk, a compact disk (CD) read only memory (ROM) unit, and/or other types of data storage units. In addition, the digital computer typically includes a mouse 26, a keyboard 28, and/or other input devices as well as a display monitor 30. The digital computer can be a personal computer or workstation such as those available commercially from IBM, Apple, or DEC. The digital computer also can be a commercially-available mini-computer or mainframe computer. The digital computer of FIG. 1B can utilize other electronic devices to implement recognition processes according to the invention. In embodiments of the invention, the components of the digital computer (and the other electronic devices, if used) generally operate cooperatively, under the direction of one or more computer programs executing on the computer, to store, access, and process data and generally perform all recognition processes described herein.

Before providing a more detailed description of the recognition processes performed by the recognition engine 10 of FIG. 1A, the interface and destination modules 12 and 14 will be described further.

Figure 2A:
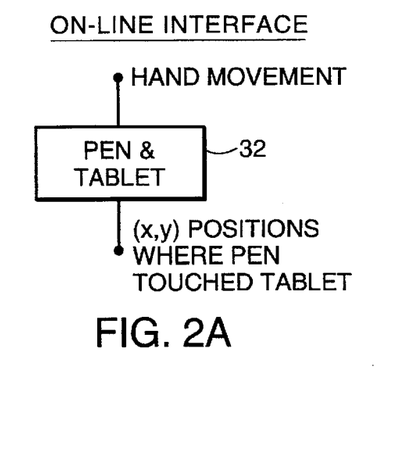
FIGS. 2A and 2B show two possible interface modules for presenting text to the recognition system of FIGS. 1A and 1B.
Figure 2B:
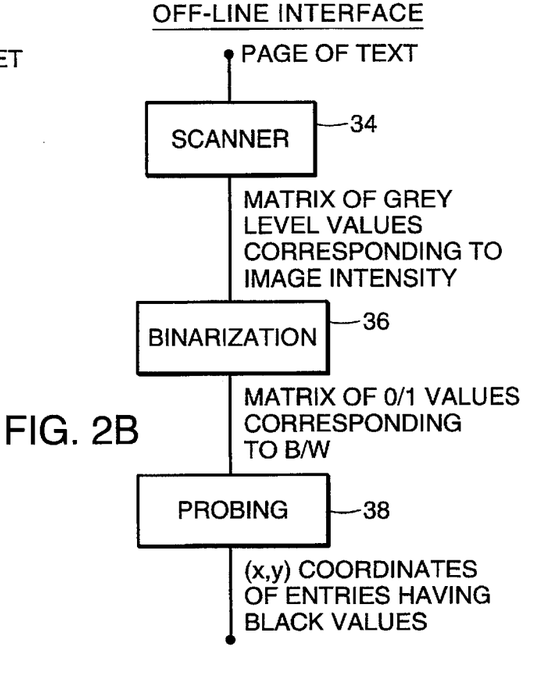

Referring to FIGS. 2A and 2B, the interface module can receive either on-line text (FIG. 2A) or off-line text (FIG. 2B). The on-line text can be created in real-time by a person using a pen-based system 32 (e.g., an Apple Newton). The input to the pen-based system 32 is the person's hand movements and the output is the X-Y coordinates which define the shapes of the characters created by the person. The off-line text can be created by feeding a page of text to an optical scanner 34 which generates grey-level data (e.g., a matrix of grey-level values which correspond to the varying intensity of the scanned page of text) and presents that data to a binarization device 36. The binarization device 36 converts the grey-level data into binary data (e.g., a matrix of "on" pixels and "off" pixels or "1" bits and "0" bits where "on" and "1" correspond to black and "off" and "0" correspond to white). The binary data is then provided to a probing device 38 which generates X-Y coordinates which define the shapes of the characters on the page of text fed to the scanner 34. The binarization device 38 of FIG. 2B can perform the conversion from grey-level values to binary values as follows. If $P(z)=P(x,y)$ represents a collection (e.g., matrix) of grey-level values, the binary "equivalent" is found by: (i) defining RD as the rectangular domain of P; (ii) sliding a k×k window over RD and calculating the average of the grey-level pixel values therein but excluding the grey-level value of the middle pixel from the calculation; (iii) if the difference between the average and the grey-level value of the middle pixel is above a certain threshold ($\tau_1$), replace the middle grey-level pixel value by the obtained average value, otherwise do nothing; (iv) convert every grey-level pixel value higher than some other threshold ($\tau_2$) to one, otherwise convert it to zero; and (v) continue moving the window until the conversion of P is complete.

Figure 3A:
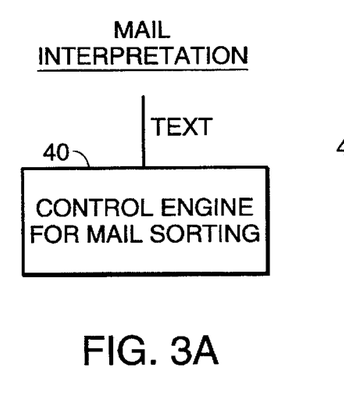
FIGS. 3A–3C are three examples of destination modules for receiving recognized text from the recognition system of FIGS. 1A and 1B.
Figure 3B:
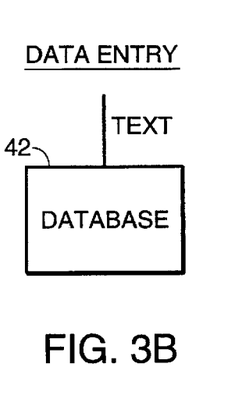

Referring to FIGS. 3A and 3B, the destination module 14 of FIG. 1A can utilize the recognized text in a variety of ways. For instance, if the text presented for recognition was addresses on mail, the recognized text can include ZIP codes which can be used by a mail sorter 40 (FIG. 3A) to sort the mail. Also, as another example, the text presented for recognition can be data to be entered into a database 42 as shown in FIG. 3B for, for example, later access and processing by a word processor, a spreadsheet, or a database manager computer application.

Figure 3C:
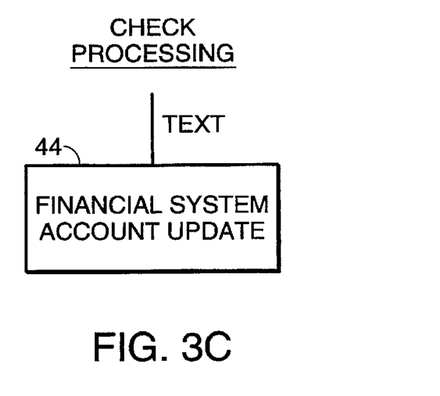
Figure 3D:
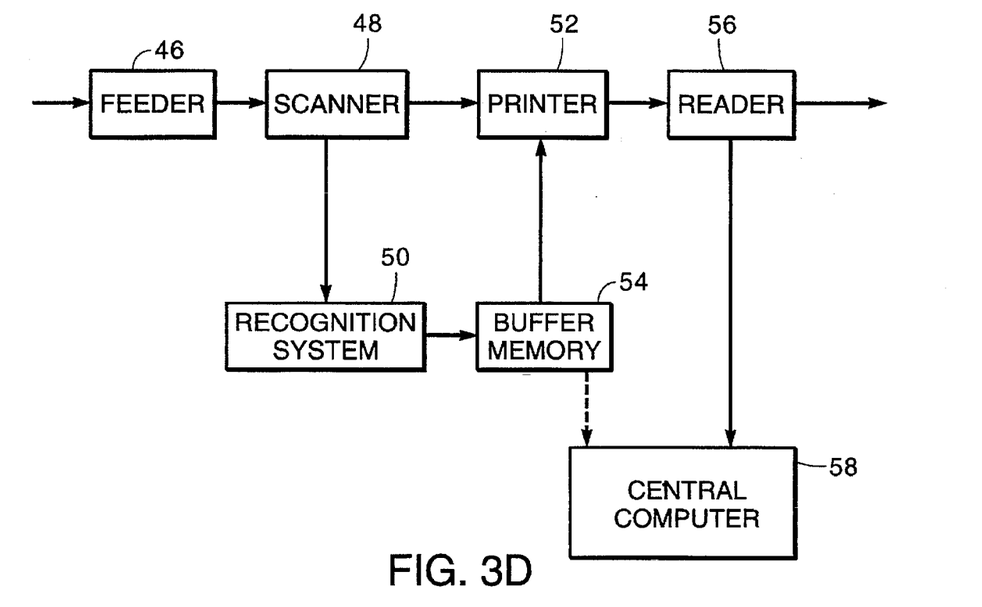
FIG. 3D is a block diagram of a bank check processing system which includes the recognition system of FIGS. 1A and 1B.

A third example is check processing. Referring to FIGS. 3C and 3D, the text presented for recognition is information from the face of a bank check such as the courtesy amount (e.g., $120.59) contained within a box on the righthand side of the check. A bank, financial institution, and/or other handler of financial instruments 44 typically collects and uses this information. The bank 44 typically includes an automatic document feeder 46 for physically moving the checks from a storage location (not shown) to a digital scanner 48. For each check, the scanner 48 can perform the functions of the scanner, binarization, and probing devices 34, 36, and 38 of FIG. 2B. The scanner 48 then supplies the X-Y coordinates to a recognition system 50 (e.g., the recognition engine 10 of FIG. 1A). After scanning, the check itself is passed by the scanner 48 to a printer 52. The recognition system 50 generates data representative of each character in the courtesy amount (or in another selected portion of the check) and passes that data as output to a buffer memory 54 or similar device. The buffer memory 54 provides the data generated by the recognition system 50 to the printer 52 which prints the courtesy amount in machine readable form, typically using magnetic ink, somewhere on the check such as below the drawer's signature line. The printer 52 then passes the check to a reader 56 which reads all of the machine readable printing on the check including pre-printed information identifying the checking account number and the bank where the checking account is maintained as well as the courtesy amount recently printed on the check by the printer 52. The reader 56 generates data representative of all of the machine readable printing located on the check and provides that data to a central computer 58 of the bank 44. The central computer 58 also can receive the data representative of the courtesy amount from the buffer memory 54, as indicated in FIG. 3D. The central computer 58 typically controls and/or initiates other aspects of the bank's operations such as sorting checks by customer account and generating periodic statements for customer accounts. Note that the recognition system 50 can be used in different configurations and settings from that shown in FIG. 3D. For example, in some configurations, the printer 52 can be eliminated, and/or one or both of the recognition system 50 and the buffer memory 54 can be part of the central computer 58.

Having described the interface and destination modules 12 and 14 of FIG. 1A in some detail, a more detailed description of the recognition processes performed by the recognition engine 10 of FIG. 1A will now be provided.

Figure 4A:
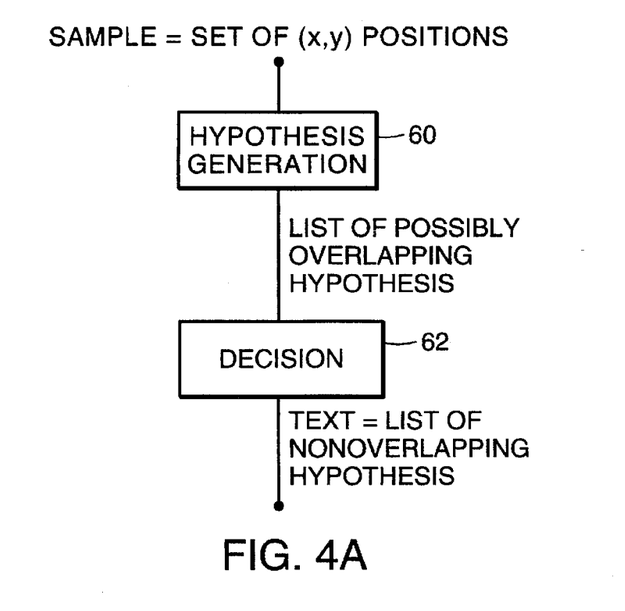
FIG. 4A is a block diagram showing the recognition system of FIGS. 1A and 1B in more detail.
Figure 7A:
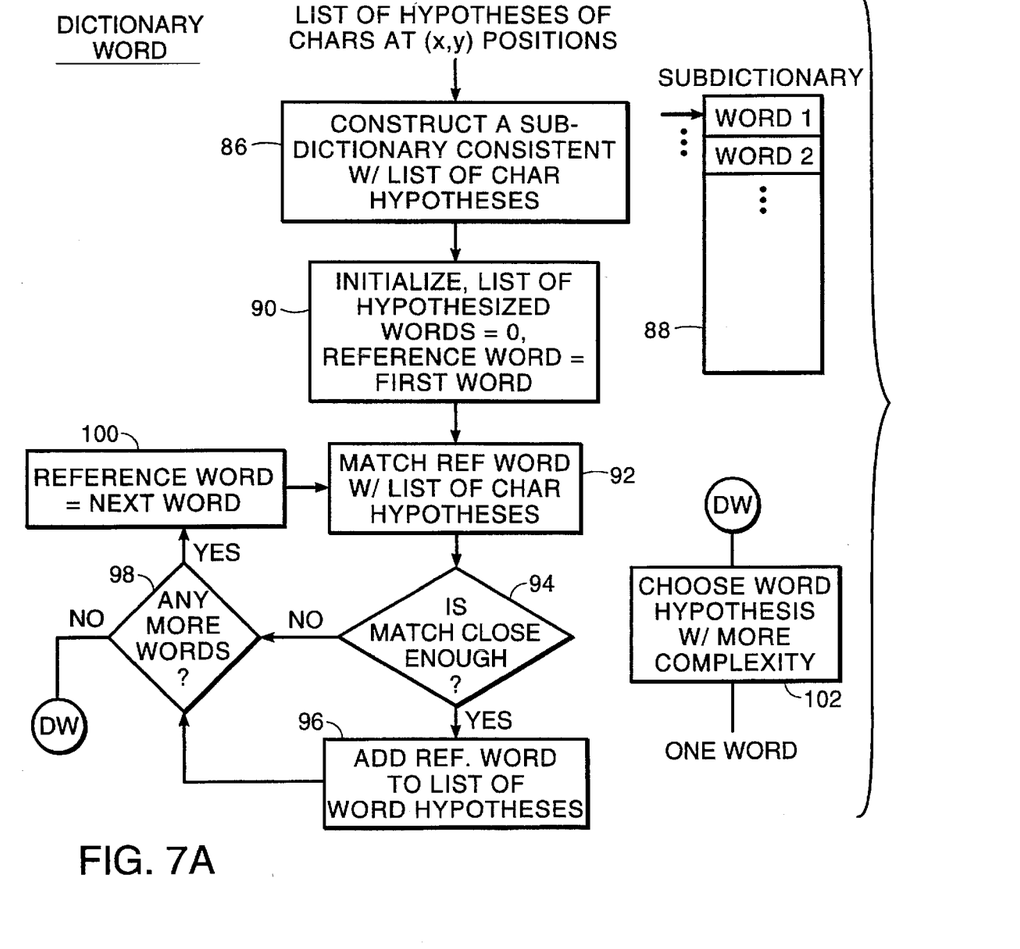
FIGS. 7A and 7B illustrate additional processing which can be performed by the first and second blocks in FIG. 4A.
Figures 7B, 8A:
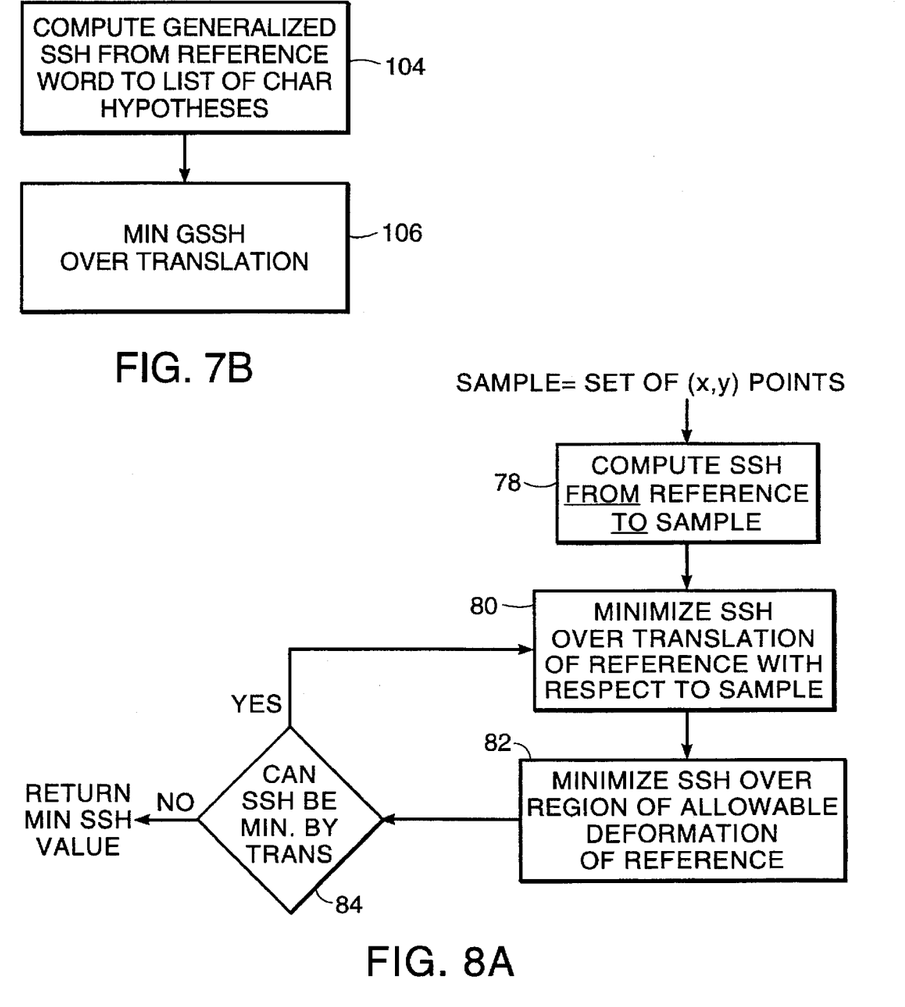
FIGS. 8A and 8B show further details of processing shown generally in FIG. 5A.
Figure 8B:
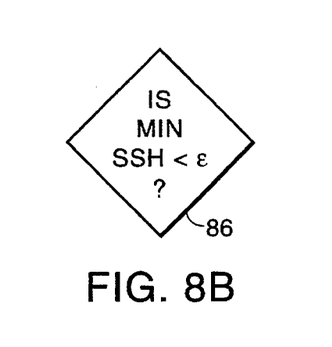

Referring to FIG. 4A, a recognition engine according to the invention performs two main functions. First, as indicated by the hypothesis generation block 60, it receives the sample to be recognized (e.g., the set of X-Y coordinates which define the shape of the to-be-recognized sample) and generates a list of known character patterns which can be found within the sample shape presented for recognition. In effect, hypothesis generation involves identifying as many known patterns as possible which are seen to be included substantially within the sample when superimposed over the sample. For example, if the sample is a representation of the letter E, the known pattern F will be found to be within the sample because when the F is superimposed over the E, it is seen to fall within the bounds of the sample E. Note, however, that if the sample is a representation of the letter F, the known pattern E will not be found to be included within the sample because when the E is superimposed over the F, it is seen that the E includes more strokes than the F (i.e., the E is neither the same as nor a subset of the sample F). The term "overlapping hypotheses" appearing in FIG. 4A can now be understood as meaning that two or more templates have been found to be included within the same sample. As described later, hypothesis generation typically includes the iterative process of deforming the known patterns in some way and then applying/reapplying them to the sample to determine if one or more of the known patterns are included substantially within the sample. FIGS. 5, 7, and 8 include further details of hypothesis generation which will be described later.

Figure 6A:
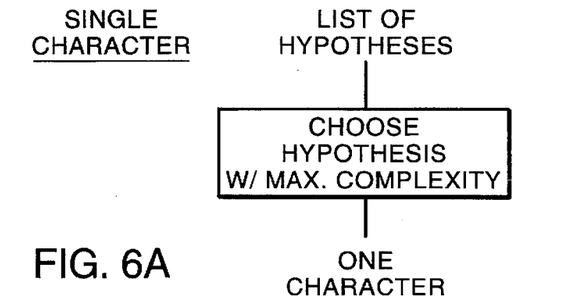
FIGS. 6A and 6B show processing performed by the second block in FIG. 4A.
Figure 6B:
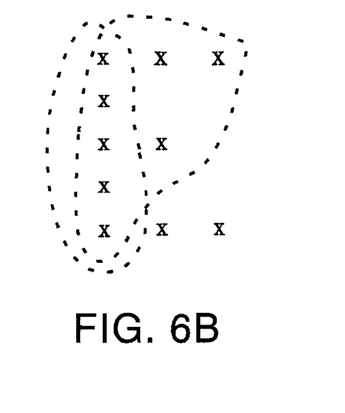

The second main function performed by the recognition engine according to the invention is indicated as the decision block 62 in FIG. 4A. The decision block 62 receives the list of known patterns determined to fall within the bounds of the sample shape and selects at least one of those known characters as a recognized version of the sample. The selection is done by determining which pattern from the list has the most information, i.e., the most complexity of shape, because that is the pattern which overlapped the most with the sample the most and thus the one which is closest in shape to the sample's shape. The decision block 62 operates according to the maximum understanding principle which says that the pattern on the list which yields the maximum understanding of the shape of the sample will be selected as the recognized version of the sample. FIGS. 6 and 7 include further details of the decision block which will be described later.

Figure 4B:
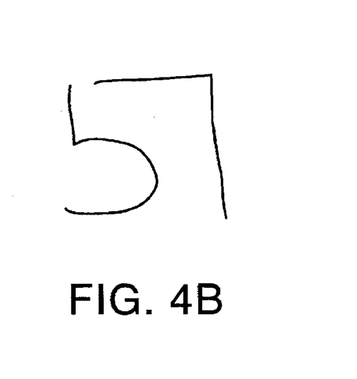
FIG. 4B is a sample to be recognized by the system of FIG. 4A.

As an example of the operation illustrated in FIG. 4A, consider the sample shown in FIG. 4B which is the handprinted number "51" with the top line of the "5" separated from the body of the "5" and running into the "1". These type of irregularities occur often in handwritten text, and we as humans have no problem determining that the sample most probably is the number "5" followed by the number "1". We might pause briefly to determine whether the sample is some unknown symbol followed by the number "7", but we would quickly dismiss this interpretation because it leaves out a large part of the sample's information (namely, the whole lefthand portion of the sample which is the body of the number "5"). The interpretation which makes the most sense to us as humans is "51". When the sample of FIG. 4B is operated upon in accordance with FIG. 4A, the list of known character patterns determined to fall within the bounds of the sample shape will be (i) "5" and "1" or (ii) "7". Because the combination of "5" and "1" yields the most information (i.e., it is more complex than just "7" by itself), "51" is selected as a recognized version of the sample shown in FIG. 4B. As another example, consider that the sample is the handprinted letter "E". From the list which will include (at least) E and F, E will be selected because it has more complexity than F (or any other characters which may be found to be included substantially within the sample such as the number "1").

Further details of FIG. 4A will now be provided.

Figure 5A:
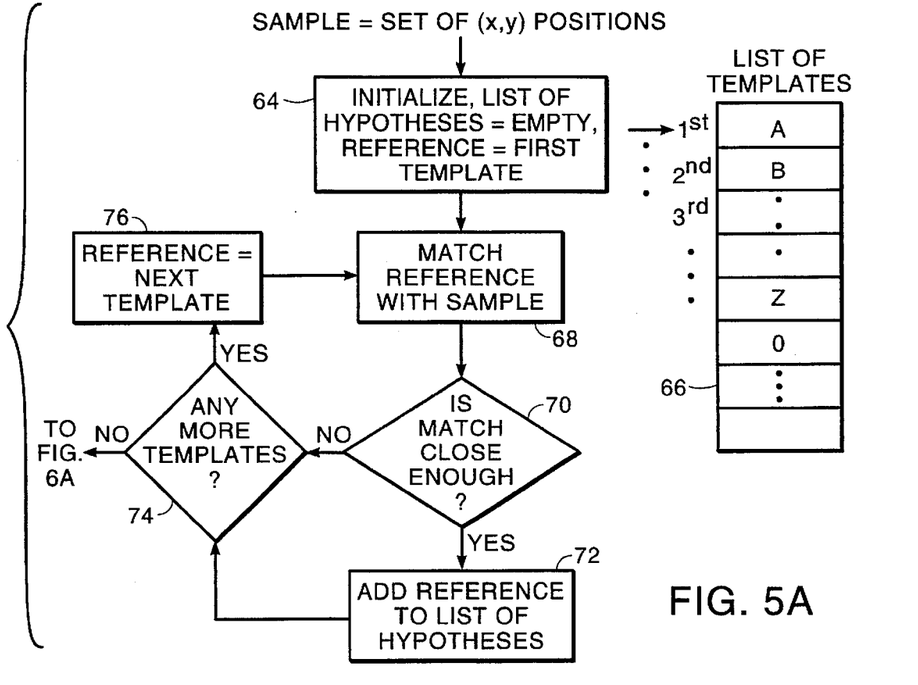
FIGS. 5A–5E illustrate processing performed by the first block in FIG. 4A.
Figure 5B:
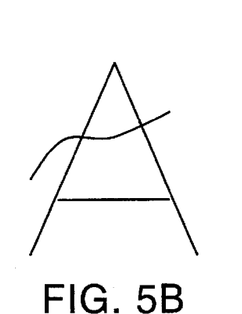
Figure 5C:
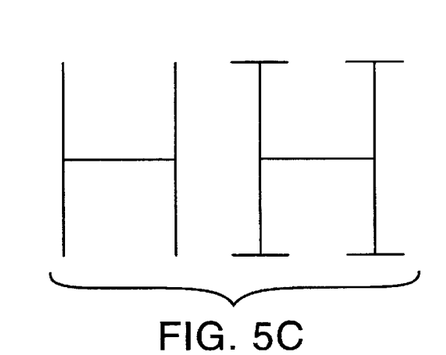

Referring to FIG. 5A, hypothesis generation (block 60 in FIG. 4A) includes (step 64) receiving the sample, initializing a hypothesis list which will eventually contain all of the character templates found to be substantially included within the sample, and accessing the first entry in a template list 66. Each entry in the template list 66 is a different "ideal" alphanumeric character template (e.g., A, B, C, ..., X, Y, Z, a, b, c, ..., x, y, z, ..., 0, 1, 2, ..., 8, 9, ...). The shape of each template is defined by a plurality of X-Y coordinate points which indicate where "on" or "black" pixels are located in a two-dimensional, X-Y grid. As described previously, the shape of the sample also is represented in this manner. Note that the template list 66 and the hypothesis list which will eventually contain all templates found to be substantially included within the sample can be maintained in memory (e.g., the main memory 20 of FIG. 1B) or by a storage device (e.g., the device 24 of FIG. 1B) of a digital computer programmed to implement the hypothesis generation process. In step 68, the first template from the template list 66 is applied to the sample and an asymmetrical mathematical measure of similarity between the two is calculated. The decision is then made (step 70) whether this measure is within some predetermined bound (e.g., $\leq \epsilon$ where $\epsilon$ is determined empirically). If the asymmetrical measure falls with the bound, this template is added to the list of hypotheses as the first entry (step 72) and processing continues to step 74. If the measure is not within the predetermined bounds, processing continues directly to step 74. At step 74, a check is made to determine if the end of the template list 66 has been reached. If the end of the template list 66 has not been reached, the next entry in the template list 66 is accessed (step 76) and processing returns to step 68 where it proceeds as described above but with the second template (then the third template, then the fourth template, etc.). When the end of the template list 66 is reached (i.e., after all templates have been applied to the sample), the hypothesis list includes all templates which are included substantially within the sample and processing proceeds to FIG. 6A.

Figure 5D:
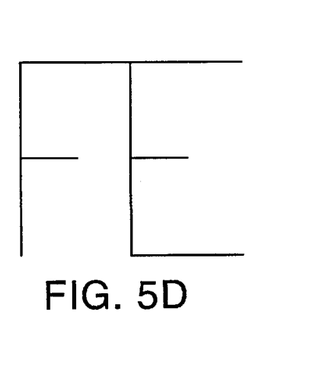
Figure 5E:
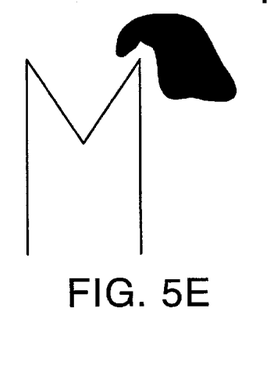

The hypothesis generation process operates in accordance with a first basic principle of the invention. This principle holds that the recognition process need not involve complete symmetrical one-to-one matching between what is known (i.e., the templates) and what is observed (i.e., the sample presented for recognition). Rather, the recognition process should be asymmetrical in that it should be a search for what is known within what is observed. In other words, recognition should not be an exercise whereby we try to make sense out of everything, but it instead should be a search for portions of what is presented for recognition that make sense to us. For example, in the "scratched" A of FIG. 5B, we find an A in the picture. Because we are not able to identify the scratch as a character, we simply reject it and focus on the portion we know, namely, the A. Similarly, if an H with serifs (righthand portion of FIG. 5C) is presented for recognition to someone who has previously only seen an H without serifs (lefthand portion of FIG. 5C), the person will find an H in the pattern; the serifs will be ignored because they will not make sense to the person. A common problem in recognition is illustrated in FIG. 5D. This is the problem of touching. The manner in which touching problems should be handled is not to segment the picture before recognition (which is the traditional approach) but to look in the whole shape for something that is known. If approached in this new, non-traditional manner, an F and an E will be found which will be recognized as an FE. The example of FIG. 5E illustrates yet another common recognition problem, namely "blobs" (e.g., ink spots or other extraneous marks). Because we cannot make sense of the blob and the M together, we interpret the sample as an M and simply ignore the blob.

All of the examples shown in FIGS. 5B-5E demonstrate the concept of asymmetry. With asymmetry, a known template can be found to be included within a sample presented for recognition even if the opposite is not true. Indeed, the opposite will almost never be true in most cases. Known systems require symmetry (i.e., they use a symmetrical criterion for matching) which appears to be a fundamentally flawed theoretical basis for matching. One consequence of asymmetry is that templates are given more emphasis than the samples. Furthermore, and contrary to the prevalent view in the recognition field, the design of templates does not require a huge training set. Starting with a particular set of templates such as the definition of letters, recognition is readily possible. By looking at more and more samples of characters, the parameters defining the allowable template deformations can be updated. Note that the template deformations themselves do not have to be determined since they are already built into the system. It is only needed to determine the extent to which these deformations are applied to the templates. The consequence is that the size of the required training set is tremendously reduced as compared to known systems. Why should five million samples be required to train a recognition system when probably no human was ever exposed to this large a set in his lifetime?

Note that the fact that a known template can be found to be included within a sample presented for recognition even if the opposite is not true (i.e., the fact that a symmetrical one-to-one correspondence is not required between the template and the sample in order for the template to be found to be included within the sample), raises another issue. What if several known patterns (i.e., templates) are found in the picture, which template do we choose? This question is related to the second basic principle of the invention which is described below.

The decision (block 62 in FIG. 4A) made as to which of all of the templates in the hypothesis list has the most complexity is illustrated in FIG. 6A. This decision uses the maximum understanding principle which was described previously and which is the second basic principle of the invention. As an example, notice that within the word LABORATORY are the words LAB, LABOR, ORATORY, and LABORATORY. We choose the word LABORATORY because it is the maximum we can understand from the word presented for recognition. A more complete understanding of the maximum understanding principle can be obtained by realizing that ambiguities in recognition are resolved by minimizing a description length of the observed data (i.e., the sample presented for recognition). The equivalence between maximum understanding and minimum description length can be seen with the help of FIG. 6B which contains the shape of the letter E using ten points (each of which is represented by an X). Encoding this letter E as a set of X-Y coordinates thus requires 2*10*K bits (or slightly less if efficient encoding is used) where K represents the number of bits required to represent a real number. If N represents the total number of templates in the template list 66 of FIG. 5A, any template can be represented in log(N) bits. If a "1" is found to be included with the sample of FIG. 6B, the five points which form the "1" can be encoded into log(N) bits (plus K bits for the position) and the other five points can be encoded using 10K bits for a total of log(N)+11K bits. If there is an "F" in the sample, we can encode it in log(N)+5K bits. Finally, for an "E", we can encode it in log(N)+K bits. Hence, maximum understanding of the sample results in the shortest description. If several templates are found to be close to the sample, we pick the template that has the maximum length of strokes, the maximum area in the case of off-line, and generally the maximum number of data points. The sum of all of the stroke lengths (or of all of the data points) of a character is a measure of that character's complexity. If a word is being recognized, we choose the dictionary word that has the largest complexity which is computed by adding up the complexity of each character which together form the word.

The matching step 68 of FIG. 5A employs the first basic principle of the invention (i.e., the use of an asymmetrical measure of similarity when trying to determine whether a template matches a sample). The matching step 68 of FIG. 5A implements this first basic operational principle by calculating a single-sided Hausdorff (SSH) distance for each template and the sample. This calculation provides an asymmetrical measure of similarity between a template and the sample. The single-sided Hausdorff also is referred to as the directed Hausdorff function. The single-sided Hausdorff is used because it captures the first basic principle of operation of the invention in that it: (i) determines if a template is in the sample, not if the template matches the sample in a symmetrical one-to-one fashion; and (ii) can operate on deformed templates where the deformations include scaling (e.g., in the X and/or Y directions), slanting, rotating, etc. Note that while a preferred embodiment of the invention uses the single-sided Hausdorff, any function which meets requirements (i) and (ii) can be used to achieve the asymmetry required by the first basic operational principle.

The details of the matching step 68 of FIG. 5A are shown in FIGS. 8A and 8B. Referring to FIGS. 8A and 8B, the first step (step 78) is to use the single-sided Hausdorff to compute a "distance" from the template to the sample. This distance is referred to as the single-sided Hausdorff (SSH) hemi-distance from the template to the sample, and it can be expressed mathematically as follows. Let $T=\{\alpha_1, \alpha_2, \ldots, \alpha_M\}$ and $S=\{\beta_1, \beta_2, \ldots, \beta_N\}$ be two finite sets of points in $R^2$ (i.e., in a two-dimensional, X-Y coordinate grid) where T represents the shape of the template and S represents the shape of the sample. Let d be the euclidean metric in $R^2$. Given these definitions, the SSH distance from T to S is $h(T,S)$, and it is determined by $$h(T,S) = \max_i \min_j d(\alpha_i, \beta_j).$$

Thus, for each point $\alpha_i$, the closest point $\beta_j$ is matched thereto. $h(T,S)$ is the largest distance between matched pairs. Note that it also is possible to use the minmax theorem to determine $h(T,S)$ by minimizing the maximum distance, as opposed to maximizing the minimum distance as shown in the above equation for $h(T,S)$. Also note that each point $\alpha_i$ represents a two-point set (namely, an X coordinate and a Y coordinate) and that each point $\beta_j$ also represents a two-point set (namely, an X coordinate and a Y coordinate), such that $d(\alpha_1,\beta_1)$, for example, is actually $d=\|(x_1,y_1)-(x_2,y_2)\|$. Computing the closest point is a classical problem in computational geometry. The direct approach (i.e., going over every pair of points in T and S) is an O(MN) algorithm meaning that the number of steps required for such an operation is on the order of M multiplied by N. A better approach is to find the Voronoi diagram of S which takes O(NlogN) steps (i.e., which requires a number of steps on the order of N multiplied by the quantity logN). With this better approach, for every point in T, the closest point in S can be found in O(logN) steps. While this might look like an O(MNlog$^2$N) algorithm, it is not, and the reason is that the Voronoi diagram is calculated for S only once. All the deformations are performed later on T (deformations are described later), and any calculation of the single-sided Hausdorff distance from T to S becomes actually an O(MlogN) operation. Compare this with the direct approach which is an O(MN) operation as mentioned above. Further details of computing the Voronoi diagram and the list of closest points can be found, for example, in textbooks on computational geometry.

If $h(T,S)$ as determined by step 78 of FIG. 8A is not small enough to indicate an acceptable match between T and S (i.e., to indicate whether T is included substantially within S), the steps which follow (steps 80, 82, and 84 in FIG. 8A) will be performed. Otherwise, steps 80, 82, and 84 will not be performed. The check to determine whether $h(T,S)$ is small enough to indicate an acceptable match between T and S is performed by step 70 of FIG. 5A. The details of step 70 of FIG. 5A are shown in step 86 in FIG. 8B. Step 86 of FIG. 8B involves a check of $h(T,S)$ to determine if it is $<\epsilon$ or $\leq\epsilon$, where $\epsilon$ is some (small) number determined a priori by empirical data. In one embodiment of the invention, $\epsilon$ is equal to 0.06.

When the value of $h(T,S)$ as determined in step 78 of FIG. 8A is not small enough, steps 80, 82, and 84 are performed to deform the template (i.e., T) in some way(s). The SSH distance from T to S (i.e., $h(T,S)$) is then computed again using the deformed template and the same (undeformed) sample, and a determination is made whether the deformation resulted in a better match (e.g., whether $h(T,S)$ is now $<\epsilon$ or $\leq\epsilon$). In general, the theory of deformation is that a shape from a higher level of abstraction emerges from a collection of shapes from a lower level of abstraction if the span of allowable deformations at the higher level intersects the collection of shapes from the lower level. The following definitions will help in understanding this theory: (i) at the lowest (e.g., pixel) level, a point is a complex number including an X coordinate positional value and a Y coordinate positional value; (ii) at the next highest level, a character is a triplet (i.e., label, size, and position) associated with a collection of points, and predefined subsets of points are called primitives; (iii) at the next highest level, a word is a triplet (label, size, and position) associated with a collection of characters; and (iv) at the next highest level, a concept is a label associated with a collection of words. Thus, a character shape emerges from a collection of points if there are certain allowable deformations (e.g., slanting by 30 degrees, disturbance of points by 1% of the character size, etc.) of that character that makes it match a subset of the collection of points. Similarly, a word shape emerges from a collection of characters if there are certain allowable deformations of that word that makes it match a subset of the collection of characters.

The allowable template deformations include positional translation (step 80 in FIG. 8A) and other linear modifications (step 82 in FIG. 8A) including scaling in the X and/or Y direction, slanting, rotating, etc. When the point is reached at which $h(T,S)$ can no longer be reduced by deforming the template T, the result is presented to step 86 of FIG. 8B (i.e., step 70 of FIG. 5A) for a determination as to whether this minimum possible value of $h(T,S)$ is small enough to constitute a finding that T is included substantially within S.

Template positional translation (step 80 of FIG. 8A) is now described. Let T be defined as before (i.e., $T=\{\alpha_1, \alpha_2 \ldots, \alpha_M\} \subset R^2$). Given this definition of T, a translation of T by t is denoted $T \oplus t$ and is defined as the set $\{\alpha_1+t,\alpha_2+t, \ldots, \alpha_M+t\}$. The problem is to find the t that minimizes $h(T \oplus t,S)$, where S is as defined before (i.e., $S=\{\beta_1, \beta_2, \ldots, \beta_N\} \subset R^2$). To solve this problem: (i) sort the points of S in such a way that the i-th point in S is the closest to the i-th point in T, listing certain points in S more than once if needed; (ii) designate the first M points of S as $S_M$; (iii) treat the sets T and $S_M$ as complex row vectors (or as 2×M matrices). By letting $Z=S_M-T$, h(T,S) becomes the magnitude of the largest entry of Z (or the largest column norm). Note that we have taken the liberty of moving between the complex vector representation of Z and the real matrix representation. These two representations are equivalent, and which one we are using should be clear from the context. Z is the matching vector (or matrix) from T to S. By drawing the entries of the complex vector Z in a plane, it is seen that the distance h(T,S) becomes the radius of the minimum enclosing circle of the points of Z, centered at the origin. By translating T by t, a translation of the points of Z by -t occurs. Also, a translation of T by t results in a translation of the axis of the plane of Z by t. Because h(T,S) is actually the radius of the smallest enclosing circle of Z centered at the origin, the following theorem results: given that T and S are sets in $R^2$, Z is the matching vector from T to S, and c is the center of the smallest enclosing circle of the entries in Z (regarded as points in $R^2$), h(T,S) decreases when T is translated by c. Next, Z must be recalculated because the matching between T and S might have been disturbed. If the new calculated Z has a center at the origin, a minima is found. Otherwise, the smallest enclosing circle is recalculated. Note that the radius of the smallest enclosing circle is guaranteed not to increase at each iteration. The reason is because, for every point in T, only a closer neighbor from S than before can be found. Thus, this translation process converges to a minimum in a finite number of steps. Note, however, that this minimum is a local minimum. While this might seem at first a disadvantage of the process, it is not. Consider, for instance, a line of connected characters containing several versions of the character A, where some are more neatly written than others. A technique which finds a global minimum will find only the best written A, and the other As will not be detected. With our translation process, however, we search for local minima, and any minimum that is less than a threshold (e.g., $\epsilon$) is accepted. In this way, detection of all of the As that are close enough to the template are guaranteed. As a final point on template translation, note that the problem of efficiently finding the smallest enclosing circle of M points has not been addressed. This is a very old problem in geometry. It is noted that the smallest enclosing circle is determined by either two or three points out of M and that the brute force approach takes $O(M^4)$ steps in the worst case. Refinements to the brute force approach allow $O(M^2)$ operations, $O(M\log M)$ operations by using Voronoi diagrams, and even O(M) steps.

Template modifications other than translation (step 82 of FIG. 8A) are now described. The human eye can easily translate, scale in one direction or the other, slant, rotate, perform linear deformations, or even do strange non-linear deformations. We have found a way to minimize the single-sided Hausdorff distance (i.e., h(T,S)) over virtually all of these deformations.

For scaling in the X and/or Y directions, let T be defined as before, let $\alpha$ be a positive real number and let P be a 2×2 matrix having $\alpha$ at the first position of the top row and at the last position of the bottom row and having 0 at the last position of the top row and at the first position of the bottom row. Given these definitions, $PT=\{P\alpha_1, P\alpha_2, \ldots, P\alpha_M\}$ is a scaling of T by P. The problem is to find $\min_{P,t} h(PT \oplus t, S)$. The direct approach for finding the nearest local minimum involves searching in a three dimensional space (two dimensions for t and one for P). A more elegant strategy, however, emerges by referring back to the matching vector Z, which is now equal to $S_M-PT$. As $\alpha$ is varied, the location of points of Z moves in the plane on straight lines of different slopes. Starting from $\alpha=1$, $\alpha$ can be either increased or decreased, and this process is equivalent to moving on each line in one direction or the other. Of interest is not the locations of the Z points, but rather the radius of the smallest enclosing circle. Hence, a check is made to determine in which direction the radius is increasing, and movement is made along that direction. While this may appear to be a tedious computation because the radius must be recalculated every time, a small trick saves a lot. By concentrating only at the point on the boundary of the circle (most of the time, there are only two or three points there), the radius of the circle formed by these points can be calculated in constant time. When $\alpha$ changes considerably, Z has to be recalculated, but there is a vast computational savings between this optimized approach and the brute force approach. Note that the scaling parameter $\alpha$ is allowed to move in an interval. Without this restriction, h(T,S) could be made zero by arbitrarily decreasing $\alpha$, for example. The same remark also applies to other deformations. The allowable intervals of the parameter deformations need not be the same for every template.

For slanting, the scaling process just described applies. The only exception is that the deformation matrix is now $$P = \begin{vmatrix} 1 & \tan\alpha \\ 0 & 1 \end{vmatrix}$$

as opposed to $$P = \begin{vmatrix} \alpha & 0 \\ 0 & \alpha \end{vmatrix}$$

which is what is used for the scaling process. As before, $Z=S_M-PT$, and points of Z move along a line. The best direction for $\alpha$ is easily determined, and the rate of change of $\min_t h(PT \oplus t, S)$ along that direction also is easily determined. For rotation, P is defined as $$P = \begin{vmatrix} \cos\alpha & \sin\alpha \\ -\sin\alpha & \cos\alpha \end{vmatrix}$$

and thus by varying $\alpha$, the points of Z will move on circles instead of straight lines. The issue of what determines the shape of the curves along which the Z points move will be addressed later. For now, the focus is on minimizing h(T,S) over a richer space of allowable deformations. Later, we will consider constrained affine transformations, and we will describe how to compute $\min_A h(AT,S)$ where A belongs to a subset of the space of affine deformations. However, since this space is not a vector space, translation will be decoupled therefrom and will be addressed separately.

For linear deformations, let T be defined as before. A deformation of T is called linear if it can be represented as a premultiplication of T by a 2×2 matrix P. P is called the representative matrix of the deformation. Examples of linear deformations include scaling in the X and/or Y directions, slanting, rotation, etc. Note that positional translation is not a linear deformation since it cannot be represented by a matrix premultiplication. If a deformation is linear, there is a bijection between the deformation and its representative matrix P, and the two can be discussed interchangeably. A sequence of linear deformations can be viewed as a path in the space of all linear deformations. The space of all allowable linear template deformations is (i) a subset of the space of all linear deformations and (ii) a path-connected subspace. The problem of recognition boils down to finding a path in the space of all allowable linear template deformations that, with appropriate translation, matches the template T to a subset of the sample S. Note that the space of all linear deformations is a four dimensional vector space, and the bases thereof are the following four matrices:

$$\begin{vmatrix} 1 & 0 \\ 0 & 0 \end{vmatrix}, \begin{vmatrix} 0 & 1 \\ 0 & 0 \end{vmatrix}, \begin{vmatrix} 0 & 0 \\ 1 & 0 \end{vmatrix}, \text{and} \begin{vmatrix} 0 & 0 \\ 0 & 1 \end{vmatrix}.$$

For every point P in the space of all linear deformations (and consequently for every point in the space of all allowable linear template deformations), there corresponds a cost equal to $\min_t h(PT \oplus t, S)$. Based on the foregoing, a template T emerges from a sample S if $$\min_P \min_t h(PT \oplus t, S) < \epsilon$$

where P represents a linear deformation of T. Note that the space of all allowable linear template deformations might have several local minima of h. The problem is to determine if there is at least one minima which is less than $\epsilon$. The direct approach is to use a gradient-like algorithm, searching for a local minimum, and repeating the process using several starting points in the space (which corresponds to deformations learned from the training set). Starting from a certain point in the space (e.g., the template), in which direction should we move to reduce the single-sided Hausdorff distance? Since we are dealing with a four dimensional space, we consider eight directions of motion along the axis and determine which directions reduce the distance. With each "good" direction (i.e., each direction which results in a reduced value of the SSH distance), we associate a vector whose norm is equal to the rate of change of the distance in that direction. Finally, we move in the direction of the sum of these vectors. We iterate the process until no movement is possible in any direction. Since the matching vector Z may change after each deformation, it is necessary to update it regularly. Stepping back a little, how do we determine if a certain direction increases the distance or decreases it? To answer this question, we return to the observation previously made about the matching vector Z, and we look at the points of Z lying on the boundary of the smallest enclosing circle (usually two or three). These points are then deformed in the direction of interest, i.e., by evaluating $(S_M - (P + \delta P)T)$ for $\delta P$ corresponding to a certain direction. Finally, we compute $\delta h / \delta P$ in that direction. Whenever we get to the boundary of the space of all allowable linear deformations, the number of allowable directions of deformations decreases, so as not to leave the space. The above-described linear deformation processes can be generalized to general spaces of operators that include non-linear deformations.

Having completed a description of FIGS. 8A and 8B, we turn now to FIGS. 7A and 7B which provide further detail of FIG. 4A. Specifically, FIGS. 7A and 7B concern recognizing word samples as opposed to character samples. In accordance with the invention, just as sets of points can be recognized as alphanumeric characters, sets of characters can be recognized as words, and sets of words can be recognized as sentences, paragraphs, concepts, etc. While the first step generally is to recognize characters, essentially the same inventive principles, tools, and processes used to recognize characters can be applied at different levels of abstraction to recognize words, sentences, etc. Feedback and interaction between the different levels generally results in an overall improvement in recognition accuracy. This concept of levels of abstraction is referred to as the layering principle.

Referring to FIG. 7A, an initial step (step 86) is to create a word template list 88 which is similar to the character template list 66 of FIG. 5A but which contains a list of ideal, known dictionary words. Once the word list 88 is in place, a set of recognized characters are provided for recognition as a word. This set of recognized characters is received, a word hypothesis list is initialized, and the first entry in a word template list 88 is accessed (step 90). In step 92, the first word template from the list 88 is applied to the sample of characters and an asymmetrical mathematical measure of similarity between the two is calculated. The decision is then made (step 94) whether this measure is within some predetermined bound (e.g., $\leq \epsilon$ where s is determined empirically). If the asymmetrical measure does fall with the bound, this word template is added to the list of word hypotheses as the first entry (step 96) and processing continues to step 98. If the measure is not within the predetermined bounds, processing continues directly to step 98. At step 98, a determination is made whether the end of the word template list 88 has been reached. If the end of the list 88 has not been reached, the next entry in the list 88 is accessed (step 100) and processing returns to step 92 where it proceeds as described above but with the second word template (then the third word template, then the fourth word template, etc.). When the end of the list 88 is reached (i.e., after all dictionary words have been applied to the sample), the hypothesis list includes all word templates which are included substantially within the sample and processing proceeds to step 102. Like the hypothesis generation process of FIG. 5A, the process of FIG. 7A operates in accordance with the first basic principle of the invention which holds that the recognition process need not involve complete symmetrical one-to-one matching between what is known (i.e., the word templates) and what is observed (i.e., the sample presented for recognition), but rather it should be asymmetrical in that it should be a search for what is known within what is observed.

In step 102 of FIG. 7A, a decision is made regarding which of all of the dictionary words in the hypothesis list has the most complexity. Thus, this step (like FIG. 6A and block 62 of FIG. 4A) uses the maximum understanding principle which was described previously and which is the second basic principle of the invention. In step 102, the complexity of a word is determined by summing the complexity of each characters which together form the word.

Further details of step 92 of FIG. 7A are illustrated in FIG. 7B. Referring to FIG. 7B, we see that a word template is matched to the sample by using the generalized single-sided Hausdorff (GSSH) function to calculate an asymmetrical measure of similarity between the word template and the sample (step 104), i.e., to determine a "distance" measure from the word template to the sample. The GSSH is similar to the SSH in that they both yield a distance as the asymmetrical mathematical measure of similarity. The following mathematical description of GSSH will illustrate the differences between GSSH and SSH.

To aid in describing the GSSH mathematically, the word template is defined as $T_w = \{c_1, c_2, \ldots, c_M\}$ where M is the integer number of characters making the word. Each $c_i$ (where $i = 1, 2, \ldots, M$) is a labeled point, i.e., a pair of X-Y coordinates together with a label identifying the point. For example, "A" could be a label indicating the character "A" such that the labeled point (10,12,A) would represent the letter "A" at the point X=10 and Y=12. Similar to the word template, the word sample is defined as $S_w = \{d_1, d_2, \ldots, d_N\}$ where N is the integer number of characters making the sample and where each $d_i$ is a labeled point. CM represents a confusion measure which is used to determine the confusion between characters. The probability that character no. 1 is misinterpreted as character no. 2 is represented by CM(char1,char2). For two characters which look similar (e.g., O and 0), the value of CM would be close to one. For two dissimilar characters (e.g., X and O), CM would be close to zero. The GSSH between a word template and a word sample is a function of the displacement in position and the confusion between labels. More specifically, the GSSH is determined by mapping each labeled point in $T_w$ to the closest labeled point in $S_w$, where "closest" is the sum of the squared euclidean distance and (1-CM(label#1,label#2)).

As an example of the use of GSSH in recognizing words, if $T_w$ is the word corresponding to LAB, a possible definition of $T_w$ in the Courier font (monospaced) is $T_w$={(0,0,L),(10, 0,A),(20,0,B)}. Assume that, from the previous layers of recognition, we collected $S_w$={(0,2,L),(0,2,I),(10,0,A), (21, -2,L),(21,-2,B),(21,-2,I)}, where the L and I at position (0,2) are overlapping hypotheses, and the L, B, and I at (21,-2) are overlapping hypotheses. Assume further that the confusion data (which only has to be determined once) was estimated from a separate experiment as follows.

note that at the level of words, optimization "tricks" (some of which are described above in connection with the SSH at the character level) typically are unnecessary because the number of labeled points at the word level typically is limited (e.g., six or less labeled points in $T_w$, and 15 or less labeled points in $S_w$) such that "brute force" approaches typically provide satisfactory results.

Having described the structure and operation of a recognition system according to the invention, results of an embodiment of the inventive recognition system will now be presented. This embodiment was implemented by appropriately programming a general purpose digital personal computer.

Figure 9A:
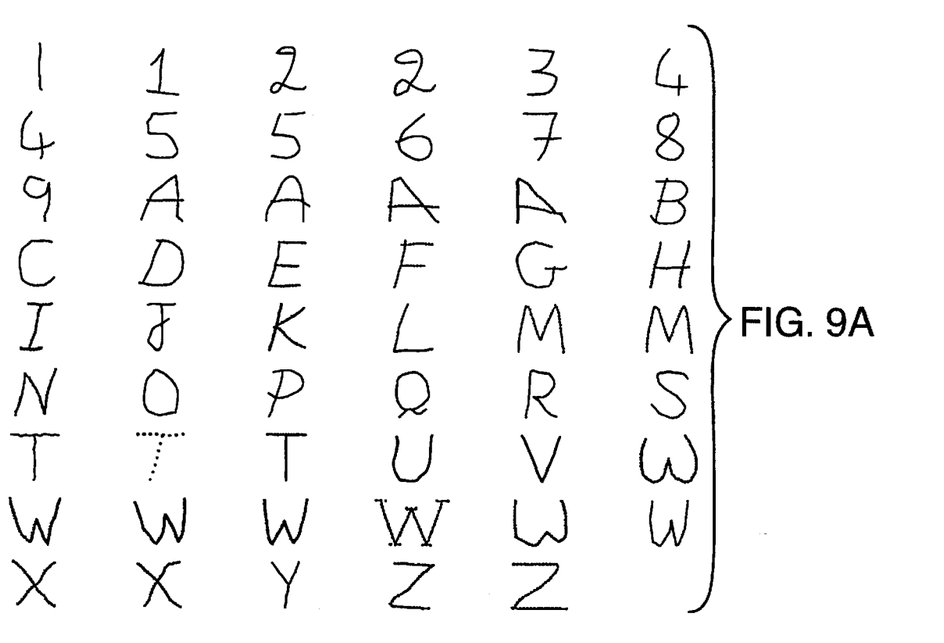
FIGS. 9A and 9B show, respectively, samples of handwritten characters recognized accurately by a recognition system according to the invention and the templates used by that system.
Figure 9B:
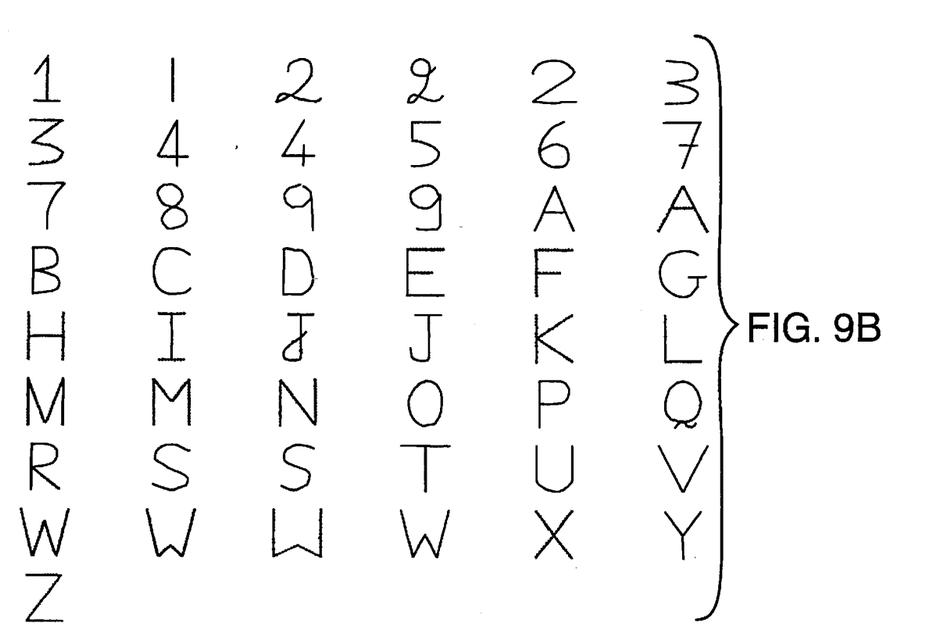

Instead of testing the recognition system according to the invention on a handwriting database such as NIST, it was tested on specific examples to illustrate the cases with which it can deal. FIG. 9A presents a sequence of sample images that were presented for recognition and that were recognized successfully, and FIG. 9B presents the sequence of template images that were used in recognizing the samples of FIG. 9A. Note that the samples in FIG. 9A were recognized successfully despite their peculiar properties, and without any preprocessing thereof. As can be seen from FIG. 9A, included in the samples presented for recognition is: a dotted

| | | | |
|---|---|---|---|
| CM(L,L) = 0.9 | CM(L,I) = 0.3 | CM(L,A) = 0.1 | CM(L,B) = 0.1 |
| CM(A,L) = 0.15 | CM(A,A) = 0.85 | CM(A,I) = 0.1 | CM(A,B) = 0.2 |
| CM(B,L) = 0.3 | CM(B,A) = 0.1 | CM(B,B) = 0.9 | CM(B,I) = 0.3 |

To measure the distance from $T_w$ to $S_w$, each point in $T_w$ is mapped to the closet (in the generalized sense) point in $S_w$. For instance, the first point in $T_w$ is at a distance of 4.1 ($2^2$+(1−0.9)=4.) from the first point in $S_w$. Also, that same first point in $T_w$ is at a distance of 4.7 ($2^2$+(1−0.3)=4.7) from the second point in $S_w$. As a result of this strategy, the labeled point (0,0,L) in $T_w$ will be mapped to the labeled point (0,2,L) in $S_w$. Also, (10,0,A) in $T_w$ will be mapped to (10,0,A) in $S_w$, and (20,0,B) in $T_w$ will be mapped to (21,-2,B) in $S_w$. This mapping results in a GSSH distance of 5.1 (max(4.1,0.15,5.1)=5.1). Assuming a threshold of 5 (e.g., ε=5), an attempt can be made to minimize GSSH by linear operations such as rotation, scaling, etc. (i.e., just as the SSH distance was minimized in steps 80, 82, and 84 of FIG. 8A, the GSSH distance calculated in step 104 of FIG. 7B can also be minimized by deforming the word template as indicated by step 106 in FIG. 7B). Note that the linear operations will operate on the coordinates of a labeled point. In this example clockwise rotation of $T_w$ around the point (10,0) by an angle having a tangent of 2/10 or 0.2 followed by a scaling results in a deformed $T_w$ (i.e., $T'_w$) which equal {(0,2,L), (10,0), (20, -2,B)}. The new GSSH distance then becomes 1.1 (max(0.1,0.15,1.1)=1.1) which is below the threshold.

Therefore, as has been shown, the GSSH distance from $T_w$ to $S_w$ (i.e., GSSH($T_w$, $S_w$)), is determined in general by $$\max_i \min_j (d^2(c_i, d_j) + (1 - CM(\text{label}(c_i), \text{label}(c_j)))).$$

where $d(c_i, d_j)$ represents the euclidean distance between coordinates of $c_i$ and coordinates of $d_j$.

While variants of the herein-described GSSH also might work, such variants typically involve a cost to the distance between the coordinates and a cost to the confusion as compared to the herein-described GSSH equation. Also, T, a W with serif, a highly distorted A, a W with curved strokes, a 5 where the horizontal stroke is disconnected from the rest of the character. All these characters were also recognized correctly in the presence of various blobs and/or scratches. In referring to FIG. 9B, note how small the training set is, how some characters have only one template, and how some other characters (e.g., W and A) only really needed one template although more than one was provided to increase reliability.

Importantly, the recognition system according to the invention can perform recognition in parallel. That is, different parts of a page of text can be processed simultaneously, and thus the system can recognize two or more characters at the same (or two or more words at the same time, etc.). In general, when the system is operated in this parallel mode, all of the characters on a page of text presented for recognition can be recognized simultaneously and in almost the same amount of time it takes to recognize a single character.

Other modifications and implementations will occur to those of ordinary skill in the art without departing from the spirit and the scope of the invention as claimed. Accordingly, the invention is to be defined not by the preceding illustrative description, but by the following claims.

What is claimed is:

1. Apparatus for recognizing alphanumeric characters within a sample, comprising:
   (A) a data storage device for storing a plurality of first sets of data, each of the first sets of data is representative of a different alphanumeric character template and includes a plurality of data points which together define the shape of the template;
   (B) a template applicator for:
      receiving a second set of data which is representative of a sample to be recognized and which includes a plurality of data points which together define the shape of the sample, accessing the first sets of data and applying each of the first sets of data to the second set of data according to a single-sided Hausdorff function to identify each template shape which is included substantially within the sample shape regardless of whether the sample shape has other portions thereof within which the template shape is not substantially included and thus regardless of whether the sample shape and the template shape have a substantially one-to-one symmetrical correspondence, and outputting a plurality of third sets of data, each of the third sets of data is representative of at least one of the template shapes identified as included substantially within the sample shape; and (C) a template selector for:

receiving the third sets of data, manipulating the third sets of data to determine which third set of data represents the template shape or shapes having the largest number of data points and designating that third set of data as representative of a recognized version of the sample, and outputting a fourth set of data which is representative of the recognized version of the sample.

2. The apparatus of claim 1 wherein the template applicator includes a template deformer for manipulating at least one of the first sets of data to deform the template represented thereby before that first set of data is applied to the second set of data.

3. The apparatus of claim 2 wherein the template deformer manipulates the first set of data to scale the size of the template.

4. The apparatus of claim 2 wherein the template deformer manipulates the first set of data to slant the template.

5. The apparatus of claim 2 wherein the template deformer manipulates the first set of data to rotate the template.

6. The apparatus of claim 2 wherein the template deformer manipulates the first set of data to deform the template by premultiplying the first set of data with a fifth set of data representative of a matrix.

7. The apparatus of claim 2 wherein the template applicator identifies template shapes included substantially within the sample shape by applying the single-sided Hausdorff function to each of the deformed templates and the undeformed sample.

8. The apparatus of claim 1 wherein the second set of data is representative of at least one handwritten alphanumeric character to be recognized.

9. The apparatus of claim 1 wherein the second set of data is representative of at least one machine-printed alphanumeric character to be recognized.

10. A method for recognizing alphanumeric characters within a sample, comprising:

(A) receiving a first set of data which is representative of a sample to be recognized and which includes a plurality of data points which together define the shape of the sample;

(B) accessing a plurality of second sets of data, each of the second sets of data is representative of a different alphanumeric character template and includes a plurality of data points which together define the shape of the template;

(C) applying each of the second sets of data to the first set of data according to a single-sided Hausdorff function to identify each template shape which is included substantially within the sample shape regardless of whether the sample shape has other portions thereof within which the template shape is not substantially included and thus regardless of whether the sample shape and the template shape have a substantially one-to-one symmetrical correspondence;

(D) providing a plurality of third sets of data, each of the third sets of data is representative of at least one of the template shapes identified as included substantially within the sample shape;

(E) manipulating the third sets of data to determine which third set of data represents the template shape or shapes having the largest number of data points and designating that third set of data as representative of a recognized version of the sample; and (F) outputting a fourth set of data which is representative of the recognized version of the sample.

11. The method of claim 10 further comprising, prior to step (C), manipulating at least one of the second sets of data to deform the template represented thereby before that second set of data is applied to the first set of data.

12. The method of claim 11 wherein the step of manipulating to deform includes manipulating the second set of data to scale the size of the template represented thereby.

13. The method of claim 11 wherein the step of manipulating to deform includes manipulating the second set of data to slant the template represented thereby.

14. The method of claim 11 wherein the step of manipulating to deform includes manipulating the second set of data to rotate the template represented thereby.

15. The method of claim 11 wherein the step of manipulating to deform includes manipulating the second set of data to deform the template represented thereby by premultiplying the second set of data with a fifth set of data representative of a matrix.

16. The method of claim 14 wherein step (C) comprises identifying template shapes included substantially within the sample shape by applying the single-sided Hausdorff function to each of the deformed templates and the undeformed sample.

17. The method of claim 10 wherein step (A) comprises receiving the first set of data which is representative of at least one handwritten alphanumeric character to be recognized.

18. The method of claim 10 wherein step (A) comprises receiving the first set of data which is representative of at least one machine-printed alphanumeric character to be recognized.

* * * * *